(12) United States Patent
Nagayama et al.

(10) Patent No.: US 10,297,871 B2
(45) Date of Patent: May 21, 2019

(54) AIR CELL CARTRIDGE AND AIR CELL SYSTEM

(71) Applicant: NISSAN MOTOR CO., LTD., Yokohama-shi, Kanagawa (JP)

(72) Inventors: Mori Nagayama, Yokohama (JP); Atsushi Miyazawa, Kamakura (JP); Yoshiko Tsukada, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 253 days.

(21) Appl. No.: 14/383,785

(22) PCT Filed: Mar. 5, 2013

(86) PCT No.: PCT/JP2013/055918
§ 371 (c)(1),
(2) Date: Sep. 8, 2014

(87) PCT Pub. No.: WO2013/133247
PCT Pub. Date: Sep. 12, 2013

(65) Prior Publication Data
US 2015/0132670 A1     May 14, 2015

(30) Foreign Application Priority Data

Mar. 9, 2012 (JP) ............................... 2012-052418
Feb. 28, 2013 (JP) ............................... 2013-038577

(51) Int. Cl.
*H01M 10/42* (2006.01)
*H01M 12/06* (2006.01)
(Continued)

(52) U.S. Cl.
CPC ..... *H01M 10/4228* (2013.01); *H01M 2/0255* (2013.01); *H01M 2/08* (2013.01);
(Continued)

(58) Field of Classification Search
None
See application file for complete search history.

(56) References Cited

U.S. PATENT DOCUMENTS 5,354,625 A * 10/1994 Bentz ...................... H01M 6/46
429/407
5,399,445 A * 3/1995 Tinker ...................... H01G 9/08
429/90

(Continued)

FOREIGN PATENT DOCUMENTS

CN      101142706 A     3/2008
EP      1 859 505 B1    11/2009
(Continued)

OTHER PUBLICATIONS

European Extended Search Report, dated Feb. 25, 2015, 6 pages.

*Primary Examiner* — Alix E Eggerding
(74) *Attorney, Agent, or Firm* — Foley & Lardner LLP

(57) ABSTRACT

An object is to prevent leakage of an electrolysis solution and reduce pressure loss. All air cell cartridge includes a plurality of air cells each including a positive electrode material, a negative electrode material and an electrolysis solution layer holding an electrolysis solution and interposed between the positive electrode material and the negative electrode material and each being provided with an air flow path through which air passes so as to come into contact with the positive electrode material, wherein a leakage prevention material (S) is provided to absorb the electrolysis solution leaked from the electrolysis solution layer and swell so as to block up the air flow path (20).

17 Claims, 5 Drawing Sheets

(51) Int. Cl.
*H01M 12/08* (2006.01)
*H01M 2/02* (2006.01)
*H01M 2/08* (2006.01)
*H01M 2/12* (2006.01)
*H01M 8/04082* (2016.01)

(52) U.S. Cl.
CPC ..... *H01M 2/1258* (2013.01); *H01M 8/04208* (2013.01); *H01M 12/06* (2013.01); *H01M 12/08* (2013.01); *Y02E 60/128* (2013.01)

(56) References Cited

U.S. PATENT DOCUMENTS

| | | | | |
|---|---|---|---|---|
| 5,451,473 | A | * | 9/1995 | Oltman ............... H01M 2/1038 429/3 |
| 2005/0112458 | A1 | | 5/2005 | Dopp et al. |
| 2010/0003577 | A1 | * | 1/2010 | Eguchi .............. H01M 8/04201 429/515 |
| 2012/0040212 | A1 | * | 2/2012 | Hermann ........... H01M 16/006 429/50 |
| 2012/0082889 | A1 | * | 4/2012 | Kruglick ................. H01G 9/10 429/185 |

FOREIGN PATENT DOCUMENTS

| | | |
|---|---|---|
| JP | 5-013113 A | 1/1993 |
| JP | 6-349529 A | 12/1994 |
| WO | WO 2004/023582 A2 | 3/2004 |

\* cited by examiner (A)

(B)

(A)

(B)

AIR CELL CARTRIDGE AND AIR CELL SYSTEM

TECHNICAL FIELD

The present invention relates to an air cell cartridge mounted on a vehicle or the like and an air cell system.

BACKGROUND ART

There is known a configurable air cell in which a plurality of unit cells of air cells arranged in series are housed in a battery case, the battery case having a structure in which water-repellent filters are attached to ventilation holes in order to prevent liquid leakage at the time of over-discharge (for example, refer to Patent Literature 1).

There is also known a button-type air cell having a structure in which an air diffusion paper having a surface layer made of water-absorbing fiber is placed between an air electrode and a positive electrode case in order to prevent liquid leakage through air holes provided in the positive electrode case (for example, refer to Patent Literature 2).

CITATION LIST

Patent Literature

Patent Literature 1: Japanese Unexamined Patent Application Publication No. 05-013113
Patent Literature 2: Japanese Unexamined Patent Application Publication No. 06-349529

SUMMARY OF INVENTION

However, in the configurable air cell described in Patent Literature 1, there is a risk of leakage of an electrolysis solution through the ventilation holes because of, for example, damage of the filters, and great pressure loss may be caused since the water-repellent filters are attached to the ventilation holes. In addition, in the air cell described in Patent Literature 2, there is a risk of leakage of an electrolysis solution through the air holes because of, for example, damage of the air diffusion paper, and great pressure loss may be caused since the air diffusion paper is attached to the air holes.

An object of the present invention is to provide an air cell cartridge and an air cell system capable of preventing leakage of an electrolysis solution and reducing pressure loss.

An air cell cartridge according to a first aspect of the present invention includes a plurality of air cells each including a positive electrode material, a negative electrode material and an electrolysis solution layer holding an electrolysis solution and interposed between the positive electrode material and the negative electrode material and each being provided with an air flow path through which air passes so as to come into contact with the positive electrode material, the air cells being arranged in a manner such that the air flow path is formed therebetween, wherein a leakage prevention material is provided in the air flow path to absorb the electrolysis solution leaked from the electrolysis solution layer and swell so as to block up the air flow path.

An air cell system according to a second aspect of the present invention includes an air cell cartridge including a plurality of air cells each including a positive electrode material, a negative electrode material and an electrolysis solution layer holding an electrolysis solution and interposed between the positive electrode material and the negative electrode material and each being provided with an air flow path through which air passes so as to come into contact with the positive electrode material, the air cells being arranged in a manner such that the air flow path is formed therebetween, wherein an air supply pipe connected to the air flow path includes: a leakage prevention material which absorbs the electrolysis solution leaked from the electrolysis solution layer and swells so as to block up the air flow path; a leakage detection sensor which detects leakage of the electrolysis solution from the air cell cartridge; a switching valve which blocks the air flow path; and an air flow blocking means which closes the switching valve to block the air flow path when the leakage detection sensor detects the leakage of the electrolysis solution.

DESCRIPTION OF EMBODIMENTS

Figure 1:
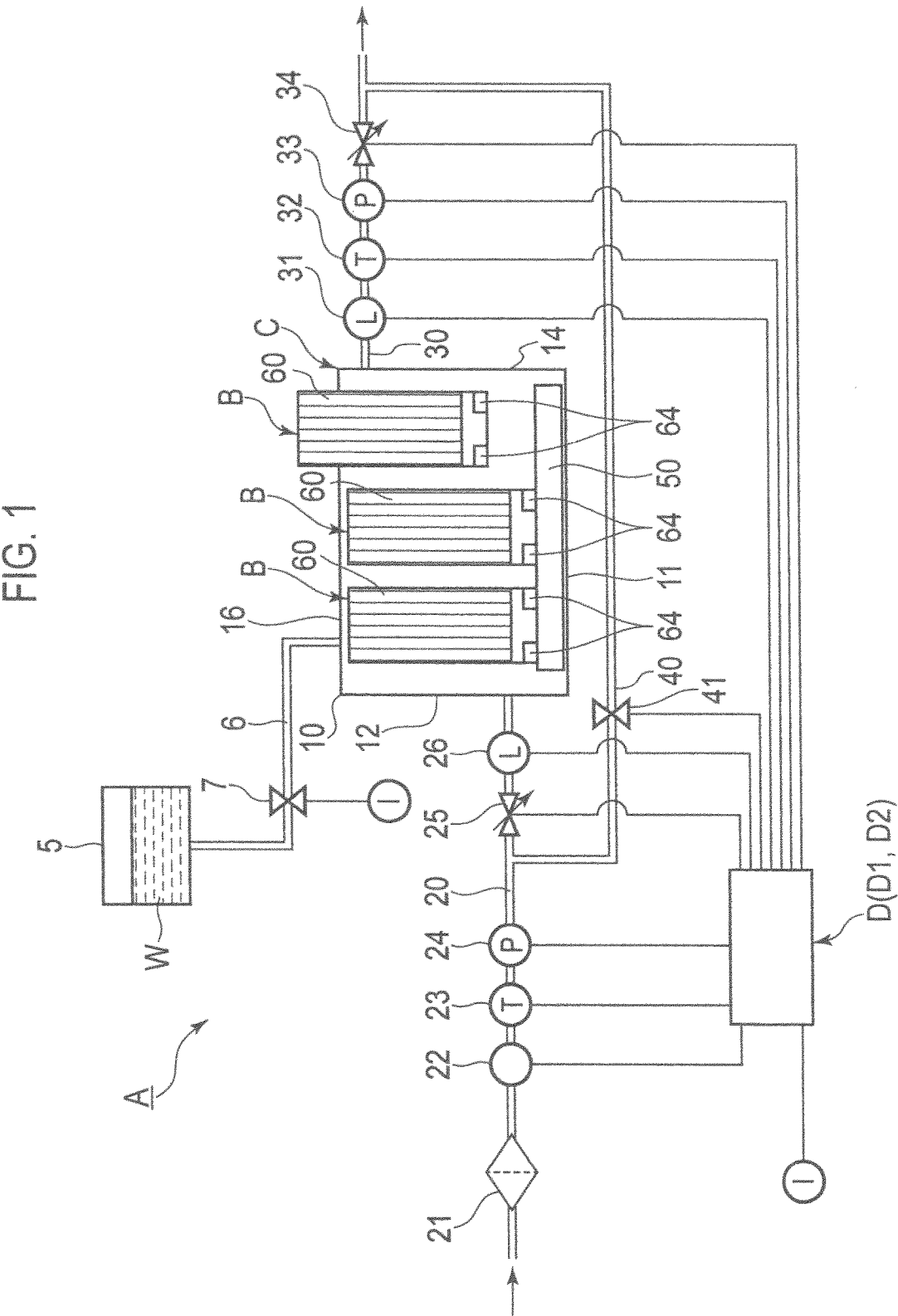
FIG. 1 is a block diagram showing a schematic configuration of an air cell system according to an embodiment of the present invention.

Hereinafter, the present embodiment will be explained with reference to the drawings; however, the scope of the present invention should be defined based on the claims and is not limited only to the embodiment described below. It should be noted that dimensional ratios in the drawings are magnified for convenience of explanation and may be different from actual ratios.

As shown in FIG. 1, an air cell system A according to the embodiment of the present invention includes a plurality of air cell cartridges (hereinafter, simply referred to as "cartridges") B, a cartridge box C from which the plural cartridges B are removable, and an electrolysis solution tank 5 connected to the cartridge box C via a supply pipe 6.

Each of the cartridges B includes a plurality of injection-type air cells 60 arranged therein. It should be noted that, although the air cell 60 is exemplified as an injection-type air cell in the embodiment of the present invention, the air cell 60 is not limited thereto, and various types of cells may be applicable. Although FIG. 1 shows three cartridges B, the number of the cartridges B is not particularly limited. Further, the number of the air cells 60 included in each cartridge B is not particularly limited.

The electrolysis solution tank 5 stores an electrolysis solution W to be injected into the air cells 60. As an example of the electrolysis solution W, an aqueous solution or a non-aqueous solution mainly containing potassium hydroxide (KOH) or chloride, may be used. The supply pipe 6 connected to the electrolysis solution tank 5 is connected to each of the cartridges B installed in the cartridge box C. The supply pipe 6 supplies the electrolysis solution W stored in the electrolysis solution tank 5 to each of the cartridges B. The supply pipe 6 is provided with a switching valve 7. The switching valve 7 is connected to a control unit D on the output side so that the control unit D operates to open and close the switching valve 7 as appropriate.

The cartridge box C includes a casing 10 for housing the plural cartridges B, and a busbar 50 installed in the casing 10. The busbar 50 is connected to connectors 64 of each of the cartridges B. The casing 10 of the cartridge box C is connected with an air supply pipe (hereinafter, also referred to as "an air flow path") 20 for supplying air to the cartridge box C and connected with an air discharge pipe (hereinafter, also referred to as "an air flow path") 30 for discharging the air from the cartridge box C.

The air supply pipe 20 is sequentially provided with, from the side from which the air is introduced into the air cell system A (from the upstream side) to the cartridge box C side (to the downstream side), a filter 21 for removing dust or the like, a blower 22 for sending the air with pressure, a temperature sensor 23, a pressure detection sensor 24, a switching valve 25, and a leakage detection sensor 26.

The blower 22 and the switching valve 25 are connected to the control unit D on the output side so as to be driven by the control unit D as appropriate. The temperature sensor 23, the pressure detection sensor 24 and the leakage detection sensor 26 are connected to the control unit D on the input side.

The temperature sensor 23 detects the temperature in the air supply pipe 20 and outputs the detected temperature data to the control unit D. The pressure detection sensor 24 detects the pressure in the air supply pipe 20 and outputs the detected pressure data to the control unit D. The leakage detection sensor 26 detects the occurrence of liquid leakage in the air supply pipe 20 and outputs the information of the liquid leakage thus detected to the control unit D.

The air discharge pipe 30 is sequentially provided with, from the upstream side of the air discharged from the cartridge box C to the downstream side, a leakage detection sensor 31, a temperature sensor 32, a pressure detection sensor 33, and a switching valve 34. The switching valve 34 is connected to the control unit D on the output side so that the control unit D operates to open and close the switching valve 34 as appropriate. The leakage detection sensor 31, the temperature sensor 32 and the pressure detection sensor 33 are connected to the control unit D on the input side.

The leakage detection sensor 31 detects the occurrence of liquid leakage in the air discharge pipe 30 and outputs the information of the liquid leakage thus detected to the control unit D. The temperature sensor 32 detects the temperature in the air discharge pipe 30 and outputs the detected temperature data to the control unit D. The pressure detection sensor 33 detects the pressure in the air discharge pipe 30 and outputs the detected pressure data to the control unit D.

The switching valve 25 on the upstream side in the air supply pipe 20 and the switching valve 34 on the downstream side in the air discharge pipe 30 are connected to the respective ends of a bypass pipe 40. In FIG. 1, one end of tire bypass pipe 40 is connected to the air supply pipe 20 between the switching valve 25 and the pressure detection sensor 24. The bypass pipe 40 is provided with a switching valve 41. The switching valve 41 is connected to the control unit D on the output side so that the control unit D operates to open and close the switching valve 41 as appropriate. Due to the switching valve 41 opened as appropriate, the air introduced into the air cell system A can pass through the bypass pipe 40 towards the discharge side.

The control unit D includes a central processing unit (CPU), an interface circuit, and the like. The control unit D fulfills the following functions by executing predetermined programs. The control unit D (first air flow blocking means D1) operates to close the switching valve 25 or 34 so as to block the air flow path 20 or 30 when the leakage detection sensor 26 or 31 detects leakage of the electrolysis solution W. Accordingly, the control unit D can stop the operation of the air cells 60. In addition, the control unit D (second air flow blocking means D2) operates to close the switching valve 25 or 34 so as to block the air flow path 20 or 30 when the pressure detection sensor 24 or 33 detects an increase in pressure in the air flow path 20 or 30.

Figure 2:
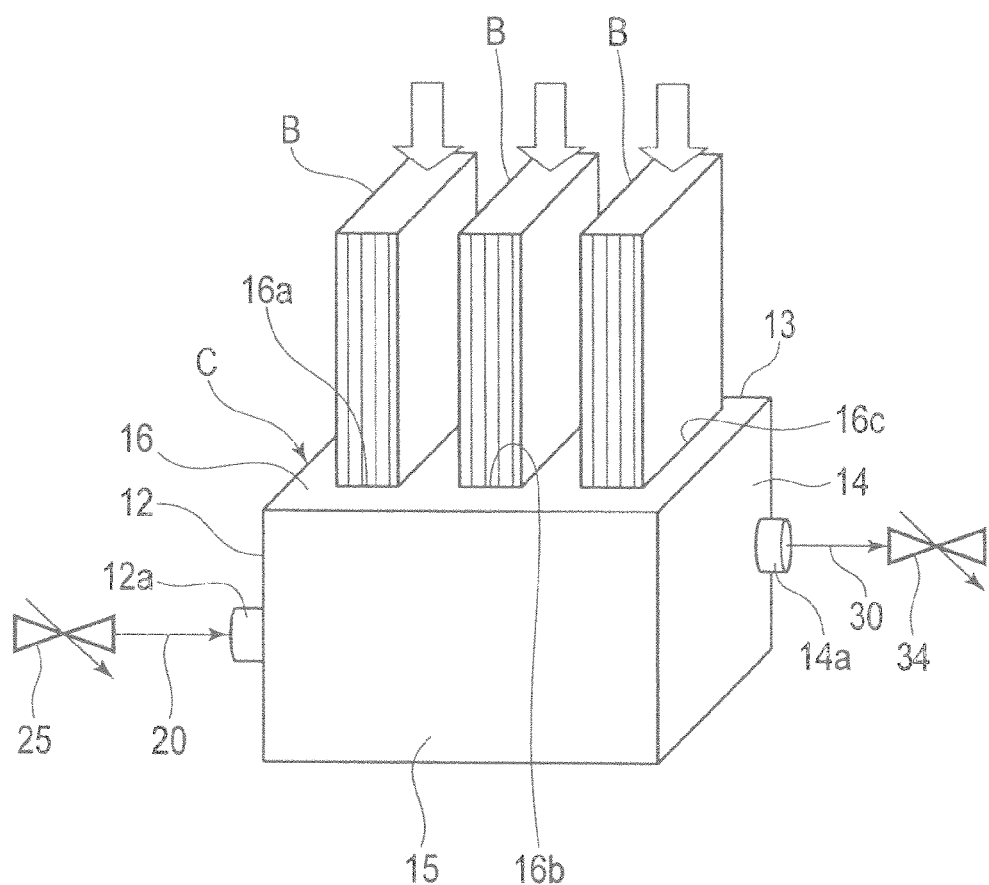
FIG. 2 is a perspective view showing part of the air cell system according to the embodiment of the present invention.

For example, the casing 10 of the cartridge box C has a rectangular parallelepiped as shown in FIG. 1 and FIG. 2. The casing 10 includes a rectangular bottom plate 11, side plates 12 to 15 vertically extending from the four sides of the bottom plate 11, and an upper plate 16 placed on the side plates 12 to 15.

As shown in FIG. 2, the upper plate 16 of the casing 10 is provided with cartridge attachment ports 16a to 16c at predetermined intervals for attaching and removing the plural cartridges B. The plural cartridges B are inserted into the casing 10 via the cartridge attachment ports 16a to 16c as indicated by the arrows in FIG. 2.

The side plate 12 of the casing 10 is provided with an introduction port 12a located towards the side plate 15 for introducing air into the casing 10. The side plate 14 of the casing 10 is provided with a discharge port 14a located towards the side plate 13 for discharging the air passing through the casing 10. The introduction port 12a and the discharge port 14a are connected to the air supply pipe 20 and the air discharge pipe 30, respectively.

Figure 3:
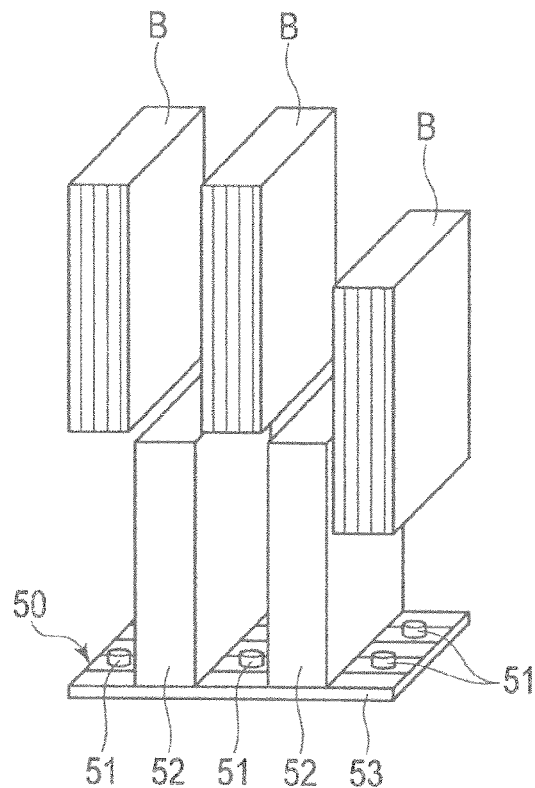
FIG. 3(A) is a perspective view showing a state of connection between a busbar and air cell cartridges.
FIG. 3(B) is a perspective view showing a flowing state of air through air cell cartridges connected to a busbar.
Figure 3:
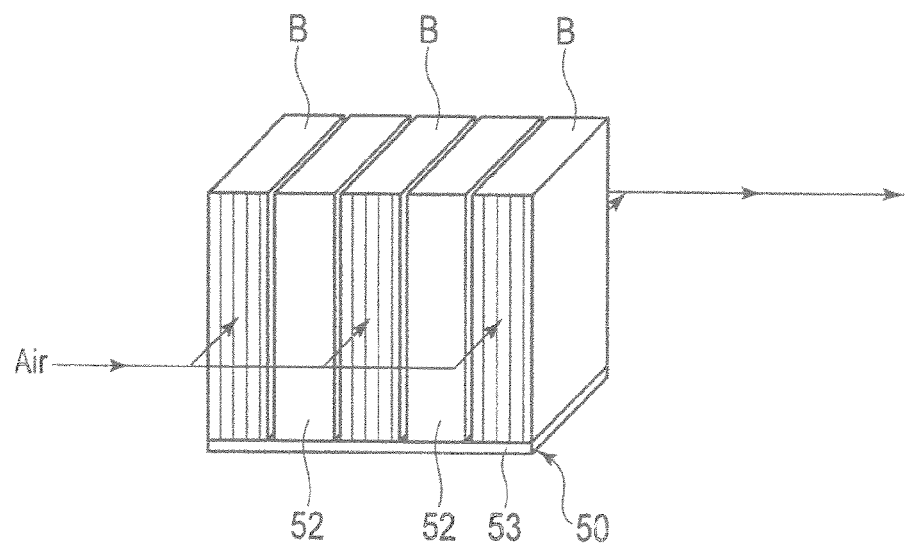

As shown in FIG. 1 and FIG. 3, the busbar 50 is placed on the bottom plate 11 of the casing 10. The busbar 50 is electrically connected to the plural cartridges B mounted thereon so as to extract electricity from the cartridges B to the outside thereof. The busbar 50 includes a base 53 on which the plural cartridges B are mounted, connectors 51 projecting from the mounting surface of die base 53 and electrically connected to the plural cartridges B, and partition members 52 for partitioning the plural cartridges B provided on the mounting surface of the base 53.

As shown in FIG. 2, the introduction port 12a and the discharge port 14a are respectively located at offset positions on the respective side plates 12 and 14, so that the air introduced from the introduction port 12a passes through the casing 10 while coming into contact with the air cells 60 included in the respective cartridges B mounted on the busbar 50 and is then discharged from the discharge port 14a, as shown in FIG. 3.

Figure 4:
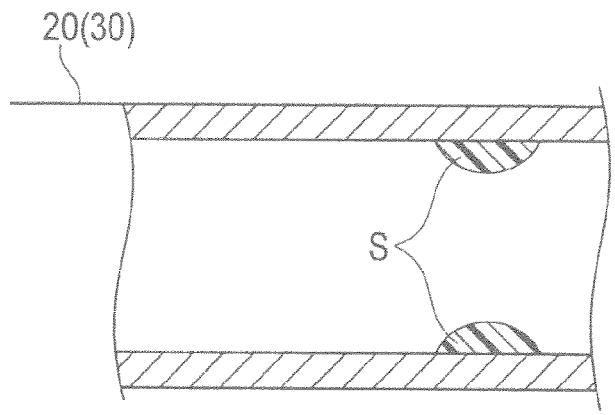
FIG. 4(A) is a cross-sectional view showing a leakage prevention material in a non-swelling state placed in an air supply pipe.
FIG. 4(B) is a cross-sectional view showing the leakage prevention material in a swelling state placed in the air supply pipe.
Figure 4:
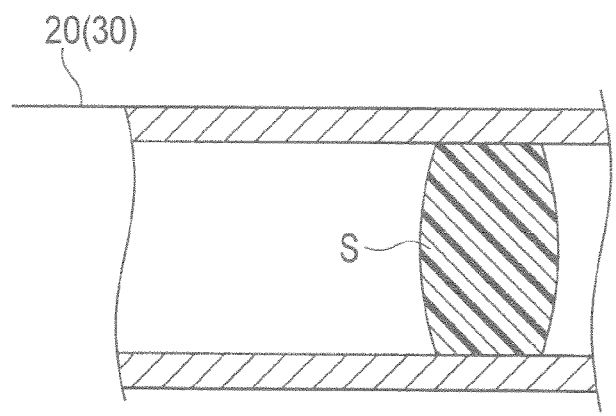

Here, a leakage prevention material S is placed in the air supply pipe 20 as shown in FIG. 4(A). The leakage prevention material S absorbs the electrolysis solution W and swells so as to block up the air supply pipe (the air flow path) 20. Examples of the leakage prevention material S include a polymer, inorganic salt forming hydrate, and a mixture of the polymer and the inorganic salt.

The leakage prevention material S is placed, for example, between the switching valve 25 and the leakage detection sensor 26 shown in FIG. 1. The leakage detection sensor 26 is preferably located closer to the cartridges B than the leakage prevention material S. In other words, the leakage prevention material S is preferably placed on the upstream side of the leakage detection sensor 26. The leakage detection sensor 26 located closer to the cartridges B than the leakage prevention material S can detect leakage of the electrolysis solution W immediately and reliably.

The leakage prevention material S placed does not block up the air supply pipe 20 before absorbing the electrolysis solution W, namely, in a non-swelling state. The way to place the leakage prevention material S is not particularly limited and may be determined, as appropriate. For example, the leakage prevention material S may be placed along the inner circumference of the air supply pipe 20. Alternatively, the leakage prevention material S may be provided at two points opposite to each other or at three points at even intervals on the inner circumference of the air supply pipe 20. The leakage prevention material S may also be provided at several points in the longitudinal direction of the air supply pipe 20.

The cross-sectional area of the leakage prevention material S in a non-swelling state perpendicular to the longitudinal direction of the air supply pipe 20, is preferably 1/20 to 1/2 of the cross-sectional area of the air supply pipe (the air flow path) 20. When the cross-sectional area of the leakage prevention material S in a non-swelling state is less than or equal to 1/2 of the cross-sectional area of the air supply pipe 20, good air supply can be ensured. When the cross-sectional area of the leakage prevention material S in a non-swelling state is greater than or equal to 1/20 of the cross-sectional area of the air supply pipe 20, the leakage prevention material S in a swelling state can surely block up the air supply pipe 20.

When the electrolysis solution W leaks out of the cartridge box C into the air supply pipe 20, the leakage prevention material S absorbs the electrolysis solution W and swells so as to block up the air supply pipe (the air flow path) 20 as shown in FIG. 4(B). As a result, the electrolysis solution W can be prevented from leaking towards the upstream side of the leakage prevention material S.

The leakage prevention material S may also be placed in the air discharge pipe 30 as in the case of the air supply pipe 20. The leakage prevention material S is placed, for example, between the leakage detection sensor 31 and the temperature sensor 32 in the air discharge pipe 30. When the electrolysis solution W leaks out of the cartridge box C into the air discharge pipe 30, the leakage prevention material S placed in the air discharge pipe 30 absorbs the electrolysis solution W and swells so as to block up the air discharge pipe 30. As a result, the electrolysis solution W can be prevented from leaking towards the downstream side of the leakage prevention material S.

Figure 5:
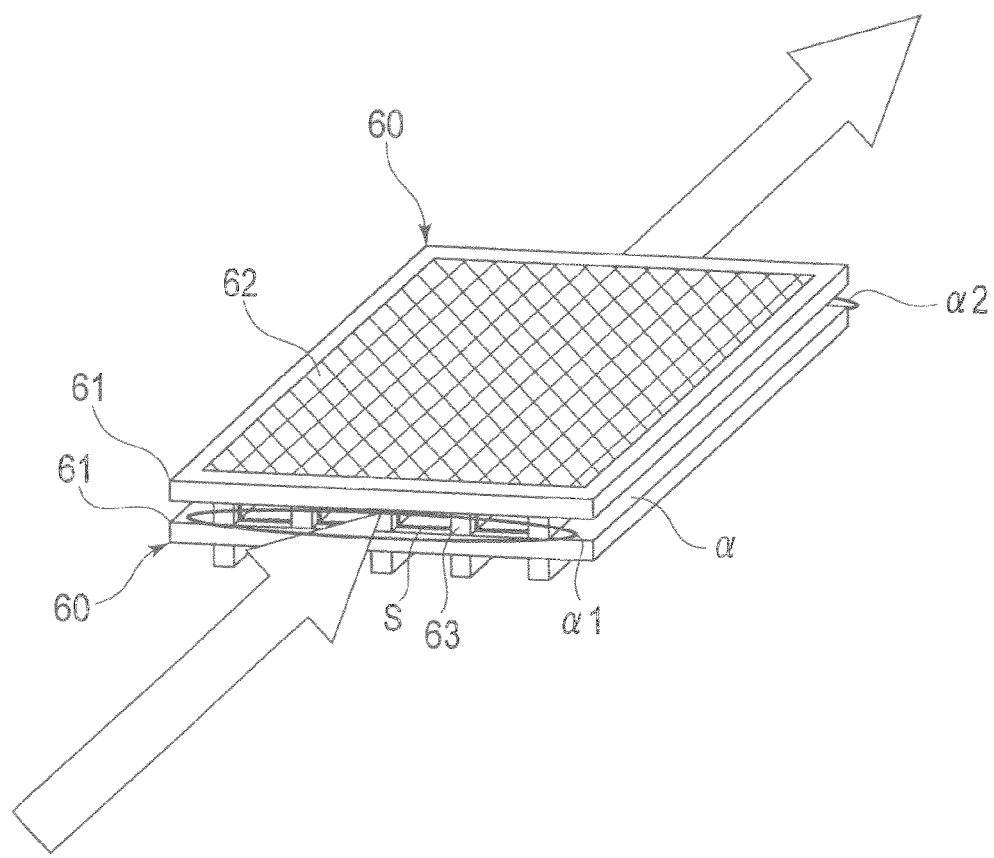
FIG. 5 is a perspective view of an air cell composing part of an air cell cartridge according to an embodiment of the present invention.

Each cartridge B is an assembled battery including the plural air cells 60 as shown in FIG. 5. The plural air cells 60 are connected to each other in series or in parallel. It should be noted that FIG. 5 shows only two air cells 60 for convenience of explanation; however, three or more of the air cells 60 may be connected to each other. Here, for reason of convenience, FIG. 5 does not show the connectors 64 connected to the busbar 50 that are shown in FIG. 1.

Each of the air cells 60 according to the embodiment of the present invention includes a square frame 61 with the upper surface open and further includes a liquid-tight air-permeable film 62, a positive electrode layer, an electrolyte layer and a negative electrode layer (each not shown in the figure) which are sequentially stacked from the above in the frame 61.

The material usable for the frame 61 may be resin having electrolysis solution resistance such as polypropylene (PP) and engineering plastic.

The liquid-tight air-permeable film 62 has liquid-tight air-permeability. Namely, the liquid-tight air-permeable film 62 is provided with a plurality of fine pores for supplying gas (air) to the positive electrode layer. At the same time, the liquid-tight air-permeable film 62 has high water repellency so as to prevent the electrolysis solution W from leaking out. The material usable for the liquid-tight air-permeable film 62 may be fluorine resin.

The positive electrode layer may be made of a porous material including a catalyst and having electric conductivity. The material usable for the negative electrode layer may be pure metal such as lithium (Li), aluminum (Al), iron (Fe), zinc (Zn) or magnesium (Mg), or an alloy thereof.

The plural air cells 60 are arranged to overlap each other in such a manner as to define an air flow path α therebetween. When power is generated, the air from the air supply pipe 20 is introduced into the cartridge box C. The introduced air flows through the air flow path α between the air cells 60 adjacent to each other as indicated by the arrow in FIG. 5 to come into contact with the positive electrode layer via the liquid-tight air permeable film 62 in each air cell 60.

The frame 61 includes a plurality of partitions 63 extending in parallel to separate the air cells 60 adjacent to each other at a predetermined interval. The air flow path α between the respective air cells 60 is divided into several paths by the partitions 63. It should be noted that, although the air flow path α is divided into several paths by the partitions 63 in FIG. 5, the air flow path α may be a single path as long as the air cells 60 adjacent to each other are separated at a predetermined interval so as to define the air flow path α.

The leakage prevention material S is placed in the air flow path α on an intake port α1 side. The leakage prevention material S absorbs the electrolysis solution W leaked out of the air cells 60 and swells so as to block up the intake port α1. Accordingly, the electrolysis solution W can be prevented from leaking out of the cartridge B. The cross-sectional area of the leakage prevention material S in a non-swelling state is preferably 1/20 to 1/2 of the cross-sectional area of the air flow path α as in the case that the leakage prevention material S is placed in the air supply pipe 20. Here, there are a plurality of intake ports oil defined by the partitions 63 in FIG. 5 and therefore the leakage prevention material S is provided at each of the intake ports α1.

According to the embodiment of the present invention, the leakage prevention material S is placed in the air flow path a on the intake port α1 side; however, the leakage prevention material S may be placed on a discharge port α2 side instead of the intake port α1 side or may be placed on both the intake port α1 side and the discharge port α2 side.

In the air cell system A according to the embodiment of the present invention, even when the electrolysis solution W leaks from the air cells 60 because of damage or the like, the leakage prevention material S placed in each of the air flow paths 20, 30 and α absorbs the leaked electrolysis solution W and swells so as to block up the air flow paths 20, 30 and α. As a result, the spread of leakage of the electrolysis solution W can be prevented. Further, since a filter for preventing leakage of the electrolysis solution W is not used in the air flow path 20, 30 or α, the pressure loss can be reduced compared with the case where a filter is provided.

In addition, since the leakage prevention material S swells to block up the air flow paths 20, 30 and α, only a small volume is required for preventing leakage of the electrolysis solution W.

In addition, since the cross-sectional area of the leakage prevention material S in a non-swelling state is 1/20 to 1/2 of the cross-sectional area of each of the air flow paths 20, 30 and α, good air flow can be ensured in the air flow paths 20, 30 and α, and the leakage of the electrolysis solution W can be reduced to a minimum.

In addition, since the leakage prevention material S is placed in the air flow path α on either the intake port α1 side or the discharge port α2 side or on both the intake port α1 side and die discharge port α2 side adjacent to each other, the leakage of the electrolysis solution W can surely be prevented. Further, the spread of leakage of the electrolysis solution W can surely be prevented even if the leakage of the electrolysis solution W from the injection-type air cells 60 occurs because of an increase in pressure resulting from the injection of the electrolysis solution W therein even though the air cells 60 are not damaged.

In addition, the plural air cells 60 are connected to each other in series, which contributes to easily increasing the output power. Alternatively, the plural air cells 60 may be connected to each other in parallel so as to keep the operation of power generation even if the electrolysis solution W leaks out.

In addition, the system A includes the leakage detection sensors 26 and 31 for detecting the leakage of the electrolysis solution W from the cartridges B and the switching valves 25 and 34 for blocking the air flow paths, and further includes the air flow blocking means D1 which closes the switching valves 25 and 34 to block the air flow paths 20 and 30. Accordingly, the operation of power generation can surely be stopped when the leakage of the electrolysis solution W is detected.

In addition, since the leakage detection sensors 26 and 31 are each positioned closer to the cartridge box C than the leakage prevention material S, the leakage can be detected immediately and reliably.

In addition, the system A includes the air flow blocking means D2 which closes the switching valves 25 and 34 to block the air flow paths 20 and 30 when an increase in pressure is detected in the air flow paths 20 and 30. Accordingly, the operation of power generation can surely be stopped when the increase in pressure is caused in association with the leakage of the electrolysis solution W.

In addition, since the pressure detection sensors 24 and 33 are each positioned closer to the cartridges B than the leakage prevention material S, the leakage can be detected immediately and reliably.

The present invention is not limited to the embodiment described above and may be applicable to the modified example described below.

Although the embodiment of the present invention has exemplified the cartridge B including the air cells 60 which are arranged in such a manner as to define the air flow path α therebetween, the air flow path may be formed in other parts other than the region between the air cells 60. For example, opposed frame members of the frame 61 are provided with intake holes and discharge holes penetrating the frame 61 at a height corresponding to the liquid-tight air-permeable film 62, so that the liquid-tight air-permeable film 62 located between the intake holes and the discharge holes may serve as the air flow path.

Although the embodiment of the present invention has exemplified the case that the leakage prevention material S is placed in each of the air cells 60, the cartridges B and the air cell system A, the leakage prevention material S may be placed in one of the air cells 60, the cartridges B and the air cell system A. Alternatively, the leakage prevention material S may be placed in two of them.

Although the embodiment of the present invention has exemplified the case that the leakage prevention material S is placed at the intake ports α1 or the discharge ports α2 of the air cells 60, the leakage prevention material S may be placed adjacent to the positive electrode layer of each air cell 60. In that case, the leakage of the electrolysis solution W can be reduced to a minimum.

The entire contents of Japanese Patent Application No. P2012-052418 (filed on Mar. 9, 2012) and Japanese Patent Application No. P2013-03857 (filed on Feb. 28, 2013) are incorporated herein by reference.

Although the present invention has been described above by reference to the embodiment, the present invention is not limited to the description thereof, and it will be apparent to those skilled in the art that various modifications and improvements can be made.

INDUSTRIAL APPLICABILITY

The present invention can prevent leakage of the electrolysis solution and can be applied to the air cell cartridge and the air cell system capable of reducing pressure loss.

REFERENCE SIGNS LIST 20, 30, α AIR FLOW PATH
24, 33 PRESSURE DETECTION SENSOR
25, 34 SWITCHING VALVE
26, 31 LEAKAGE DETECTION SENSOR
60 AIR CELL
B AIR CELL CARTRIDGE
D1 FIRST AIR FLOW BLOCKING MEANS
D2 SECOND AIR FLOW BLOCKING MEANS
S LEAKAGE PREVENTION MATERIAL

The invention claimed is:

1. An air cell cartridge, comprising:
a plurality of air cells each including
a positive electrode material,
a negative electrode material, and
an electrolysis solution layer holding an electrolysis solution and interposed between the positive electrode material and the negative electrode material,
the plurality of air cells being provided with an air flow path through which air passes so as to come into contact with the positive electrode material, the air cells being arranged to overlap such that the air flow path is formed between the air cells,
wherein a leakage prevention material is provided in the air flow path to absorb electrolysis solution leaked from the electrolysis solution layer and to swell so as to block the air flow path,
wherein the leakage prevention material is disposed on an inner circumference of the air flow path such that the leakage prevention material does not block off the air flow path in a non-swelling state, and is configured to absorb the electrolysis solution and to swell so as to block off the air flow path in a swelling state,
wherein a cross-sectional area of the leakage prevention material in the non-swelling state is $1/20$ to $1/2$ of a cross-sectional area of the air flow path, and
wherein the leakage prevention material contains an inorganic salt forming hydrate.

2. The air cell cartridge according to claim 1, wherein the leakage prevention material is placed in the air flow path on either an intake port side or a discharge port side or on both the intake port side and the discharge port side.

3. The air cell cartridge according to claim 1, wherein the leakage prevention material is a mixture of a polymer and the inorganic salt.

4. The air cell cartridge according to claim 1, wherein the air cells are connected to each other in series or in parallel.

5. An air cell cartridge comprising the air cells according to claim 1 which are injection-type air cells.

6. The air cell cartridge according to claim 1, wherein:
the air flow path comprises a plurality of air flow paths, and
at least one of the plurality of air flow paths is divided by a plurality of partitions.

7. The air cell cartridge according to claim 6, wherein a filter is not provided in one or more of the plurality of air flow paths.

8. The air cell cartridge according to claim 1, wherein the leakage prevention material is provided at a plurality of points at intervals in a circumferential direction of the air flow path.

9. The air cell cartridge according to claim 1, wherein the air flow path comprises an intake port and a discharge port, and the leakage prevention material is placed on an intake port side or a discharge port side in the air flow path.

10. An air cell system, comprising:
an air cell cartridge comprising
a plurality of air cells, each including
a positive electrode material,
a negative electrode material, and
an electrolysis solution layer holding an electrolysis solution and interposed between the positive electrode material and the negative electrode material,
the plurality of air cells being provided with an air flow path through which air passes so as to come into contact with the positive electrode material, the air cells being arranged to overlap such that the air flow path is formed between the air cells,
wherein an air supply pipe arranged outside the air cell cartridge and configured to supply air to the air cell cartridge includes
a leakage prevention material configured to absorb electrolysis solution leaked from the electrolysis solution layer and to swell so as to block the air supply pipe;
a leakage detection sensor configured to detect leakage of the electrolysis solution from the air cell cartridge; and
a switching valve configured to block the air supply pipe,
wherein the air cell system further comprises a first air flow blocking control unit configured to close the switching valve to block the air supply pipe when the leakage detection sensor detects the leakage of the electrolysis solution,
wherein the leakage prevention material is disposed on an inner circumference of the air supply pipe such that the leakage prevention material does not block off the air supply pipe in a non-swelling state, and is configured to absorb the electrolysis solution and to swell so as to block off the air supply pipe in a swelling state,
wherein a cross-sectional area of the leakage prevention material in the non-swelling state is $\frac{1}{20}$ to $\frac{1}{2}$ of a cross-sectional area of the air supply pipe, and
wherein the leakage prevention material contains an inorganic salt forming hydrate.

11. The air cell system according to claim 10, wherein the leakage detection sensor is positioned closer to the air cell cartridge than the leakage prevention material.

12. The air cell system according to claim 10, further comprising:
a pressure detection sensor installed in the air supply pipe; and
a second air flow blocking control unit configured to close the switching valve to block the air supply pipe when the pressure detection sensor detects an increase in pressure in the air supply pipe.

13. The air cell system according to claim 12, wherein the pressure detection sensor is positioned closer to the air cell cartridge than the leakage prevention material.

14. The air cell system according to claim 10, wherein:
the air flow path comprises a plurality of air flow paths, and
one or more of the plurality of air flow paths is divided by a plurality of partitions.

15. The air cell system according to claim 10, wherein the leakage prevention material is placed at a plurality of points along the air supply pipe.

16. The air cell system according to claim 10, wherein the leakage prevention material is provided at a plurality of points at intervals in a circumferential direction of the air supply pipe.

17. The air cell system according to claim 10, wherein the air supply pipe comprises an intake port and a discharge port, and the leakage prevention material is placed on an intake port side or a discharge port side in the air supply pipe.

* * * * *